(12) United States Patent
Turnquist et al.

(10) Patent No.: US 6,308,958 B1
(45) Date of Patent: Oct. 30, 2001

(54) ARRANGEMENT AND METHOD FOR RADIALLY POSITIONING A TURBINE BRUSH SEAL

(75) Inventors: Norman Arnold Turnquist, Carlisle; Christopher Edward Wolfe, Niskayuna, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/556,803

(22) Filed: Apr. 24, 2000

Related U.S. Application Data
(60) Provisional application No. 60/159,013, filed on Oct. 12, 1999.

(51) Int. Cl.[7] .................................................. F16J 15/447
(52) U.S. Cl. .......................................... 277/355; 277/347
(58) Field of Search ...................................... 277/347, 355, 277/412

(56) References Cited

U.S. PATENT DOCUMENTS

| | | | |
|---|---|---|---|
| 5,114,159 | * | 5/1992 | Baird et al. ............................ 277/355 |
| 5,400,586 | * | 3/1995 | Bagepalli et al. .................... 277/355 |
| 5,630,590 | * | 5/1997 | Bouchard et al. .................... 277/355 |
| 5,749,584 | | 5/1998 | Skinner et al. ........................ 277/53 |
| 6,027,121 | * | 2/2000 | Cromer et al. ........................ 277/355 |
| 6,105,967 | * | 8/2000 | Turnquist et al. .................... 277/355 |

FOREIGN PATENT DOCUMENTS

| | | |
|---|---|---|
| 0836040 | 4/1998 | (EP) . |
| 0911554 | 4/1999 | (EP) . |
| 2301635 | 12/1996 | (GB) . |
| 9736094 | 10/1997 | (WO) . |
| 9930065 | 6/1999 | (WO) . |

* cited by examiner

*Primary Examiner*—Anthony Knight
*Assistant Examiner*—Enoch Peavey
(74) *Attorney, Agent, or Firm*—Donald S. Ingraham; Christian G. Cabou

(57) ABSTRACT

An arrangement and method for radially positioning a brush seal relative to a rotor provides a main seal segment having a slot open toward the rotor and an interior ledge facing away from the rotor, a brush seal segment in the slot and having an exterior shoulder facing toward the rotor and overlying the interior ledge such that the brush seal segment can move radially relative to the main seal segment and rotor and the exterior shoulder can move toward and away from the interior ledge, a shim disposed and establishing a minimum spacing between the interior ledge and the exterior shoulder, and set screws tightened into spaced threaded holes in the main seal segment forcing the exterior shoulder against the shim and to the minimum spacing from the interior ledge so as to prevent radial floating of the brush seal segment in the slot.

21 Claims, 3 Drawing Sheets

ARRANGEMENT AND METHOD FOR RADIALLY POSITIONING A TURBINE BRUSH SEAL

This application claims priority of a Provisional Application entitled "Radially Adjustable Brush Seal For Steam Turbines" by Norman A. Turnquist et al., Ser. No. 60/159,013 filed Oct. 12, 1999.

BACKGROUND OF THE INVENTION

The present invention generally relates to brush seals for rotary machines, such as steam and gas turbines, and, more particularly, is concerned with an arrangement and method for radially positioning a turbine brush seal.

Rotary machines, such as steam and gas turbines, used for power generation and mechanical drive applications are generally large machines having multiple turbine stages. In turbines, high pressure fluid flowing through the turbine stages must pass through a series of stationary and rotary components, and seals typically are used between the stationary and rotating components to minimize leakage of the fluid. The efficiency of the turbine is dependent on the ability of the seals to prevent fluid leakage.

Traditionally, one type of seal that is used to control fluid leakage in turbines is a labyrinth seal which has sharp rigid teeth. While the labyrinth seal has proven to be quite reliable, its performance degrades over time. This occurs as a result of transient events in which the stationary and rotating components move radially relative to and thus interfere with one another causing rubbing on the teeth of the labyrinth seal so as to enlarge the clearance between the stationary and rotating components and allow an increase of leakage.

Another type of seal that is used in combination with the labyrinth seal to improve leakage control is a brush seal. The brush seal is generally less prone to leakage than the labyrinth seal because the brush seal has seal bristles that can flex and thus better accommodate the relative radial movement between the stationary and rotating components. The brush seal also generally conforms better to surface non-uniformities than does the labyrinth seal. Such combination brush and labyrinth seal arrangements are disclosed in U.S. Pat. No. 5,749,584 to Skinner et al. assigned to General Electric Company, the assignee of the present invention, and U.K. Pat. Application No. 2,301,635 to Hemsley et al assigned to GEC Alsthom Limited.

A problem exists, however, with some combination brush and labyrinth seal arrangements. Accurate radial positioning of the brush seal relative to the rotor must be achieved in order to gain optimum performance while not adversely affecting rotordynamics. In the current method of assembly, a slot is provided in the labyrinth seal to receive the brush seal. The cross-sectional size of the slot is larger than the cross-sectional size of the portion of the brush seal that is received in the slot to facilitate the ease of mounting of the brush seal to the labyrinth seal. The larger cross-sectional size of the slot results in there being sufficient radial clearance between the brush seal and labyrinth seal to allow the brush seal to "float" radially within the slot, making it difficult to accurately align the brush seal to the rotor. The current method may allow the seal radial position to vary by several thousandths of an inch over its arc length. These variations may reduce the desired seal performance.

Consequently, a need exists for an innovation which will provide an effective solution to the aforementioned problem without introducing any new problems in place thereof.

BRIEF SUMMARY OF THE INVENTION

The present invention provides an arrangement and method for radially positioning a turbine brush seal designed to satisfy the aforementioned need. The arrangement and method of the present invention utilize a shim of a desired thickness to locate a brush seal at a desired position relative to a rotor of a turbine and one or more fasteners, such as set screws, to hold the brush seal at such position against the shim. The use of the shim allows for radial adjustment of the brush seal position. The current method of assembly of the brush seal to the labyrinth seal is generally retained but without allowing the brush seal to "float" radially within the slot of the labyrinth seal. Instead, once the brush seal and the shim are inserted into the slot of the labyrinth seal, the fasteners are tightened to hold the brush seal against the shim and thus at the desired radial position relative to the labyrinth seal as determined by the thickness of the shim. These seemingly simple added elements of the arrangement and step of the method permit the achievement of total control circumferentially and radially of the position of the brush seal relative to the labyrinth seal.

In one embodiment of the present invention, an arrangement and method are provided for radially positioning a turbine brush seal relative to a main seal, such as a labyrinth seal, and a turbine rotor. The arrangement and method employ a main seal segment and a brush seal segment. The main seal segment has a slot open toward the rotor and defining an interior ledge facing away from the rotor. The brush seal segment has an exterior shoulder facing toward the rotor and a portion smaller in size cross-sectionally than the slot so as to allow insertion of the brush seal segment into the slot where the exterior shoulder of the brush seal segment overlies the interior ledge of the main seal segment and the brush seal segment can move radially relative to the main seal segment and rotor and the exterior shoulder of the brush seal segment can move toward and away from the interior ledge of the main seal segment. The arrangement and method also employ means for establishing a minimum spacing between the interior ledge of the main seal segment and the exterior shoulder of the brush seal segment. The arrangement and method further employ means for forcing the brush seal segment toward the rotor such that the exterior shoulder of the brush seal segment is brought toward the interior ledge of the main seal segment so as to place and hold the exterior shoulder of the brush seal segment at the established minimum spacing relative to the interior ledge of the main seal segment and thereby prevent radial floating of the brush seal segment relative to the main seal segment and rotor.

The main seal segment has an arcuate shape for placing the main seal segment about the rotor, an outer periphery facing away from the rotor, an inner periphery spaced radially inwardly from the outer periphery and facing toward the rotor, and a slot defined in the main seal segment between the outer and inner peripheries thereof. The slot has a radial portion open at the inner periphery and extending away from the rotor toward the outer periphery and an axial portion spaced from the outer and inner peripheries and merging in a transverse relationship from a side of the radial portion along the rotor so as to define the interior ledge in the main seal segment facing away from the rotor. The brush seal segment has an arcuate shape for conforming to the arcuate-shaped main seal segment, a radial section, and an axial section connected to and merging in a transverse relationship from a side of the radial section so as to define the exterior shoulder on the brush seal segment facing toward the rotor such that the radial and axial sections of the brush seal segment conform in shape to the radial and axial portions of the slot of the main seal segment as to slidably fit therein with the brush seal segment being movable radially relative to the main seal segment and the rotor and with the exterior shoulder of the brush seal segment overlying and being movable toward and away from the interior ledge of the main seal segment. The means for establishing the minimum spacing includes a shim which is disposed between the interior ledge of the main seal segment and the exterior shoulder of the brush seal segment and has a thickness which establishes the minimum spacing between the interior ledge of the main seal segment and the exterior shoulder of the brush seal segment. The shim is comprised of a substantially rigid material such that the thickness of the shim is maintained when pressure is applied to the shim. The means for forcing the brush seal segment toward the rotor includes at least two threaded holes extending through the main seal segment to the slot at spaced apart locations on the main seal segment and at least two screws each being tightened into one of the threaded holes of the main seal segment and into contact with spaced apart locations on the brush seal segment so as to place and hold the exterior shoulder of the brush seal segment at the minimum spacing from the interior ledge of the main seal segment as established by the shim.

DETAILED DESCRIPTION OF THE INVENTION

Figure 1:
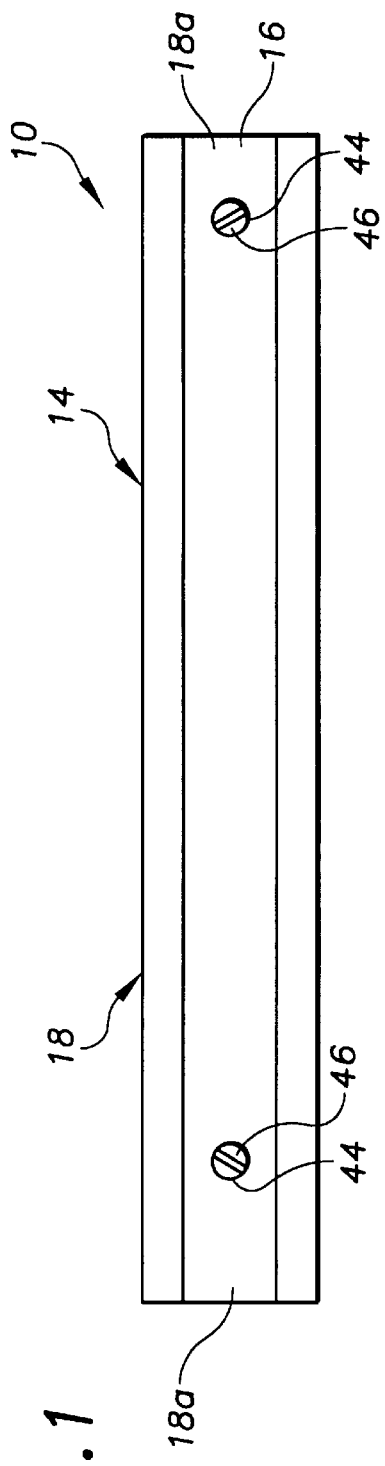
FIG. 1 is a top plan view of a seal arrangement of the present invention.
Figure 2:
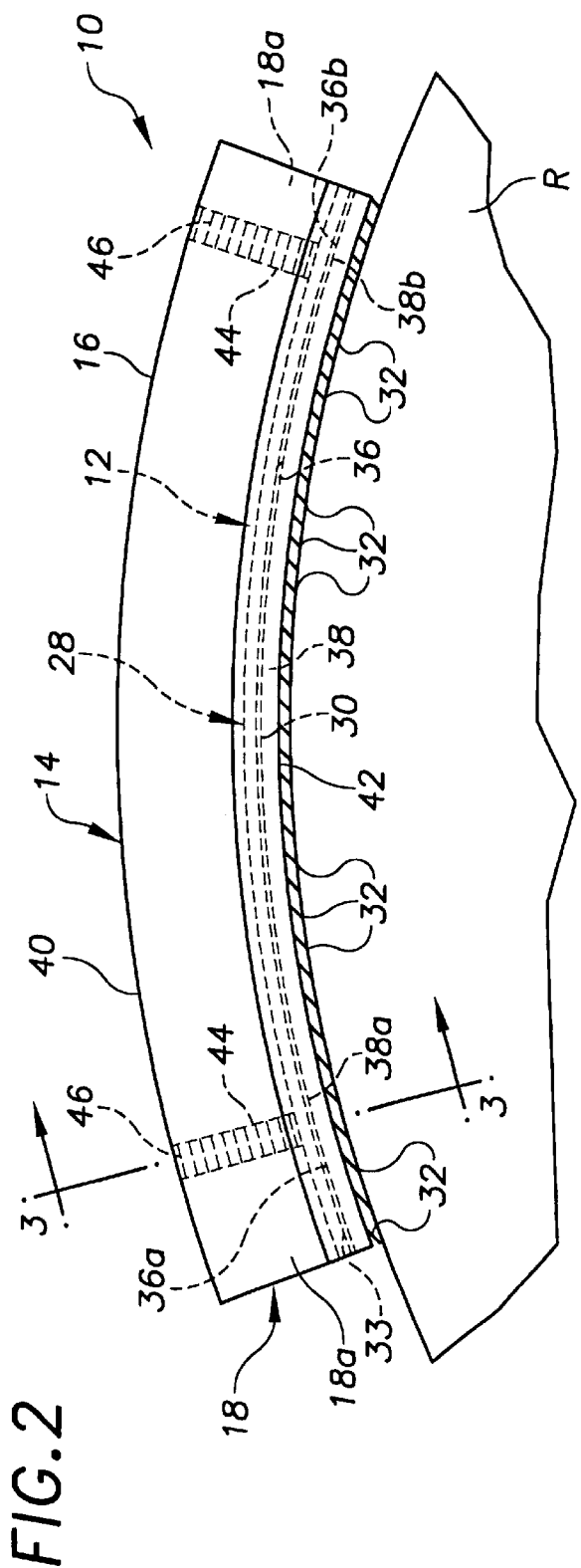
FIG. 2 is a side elevational view of the seal arrangement of FIG. 1.
Figure 3:
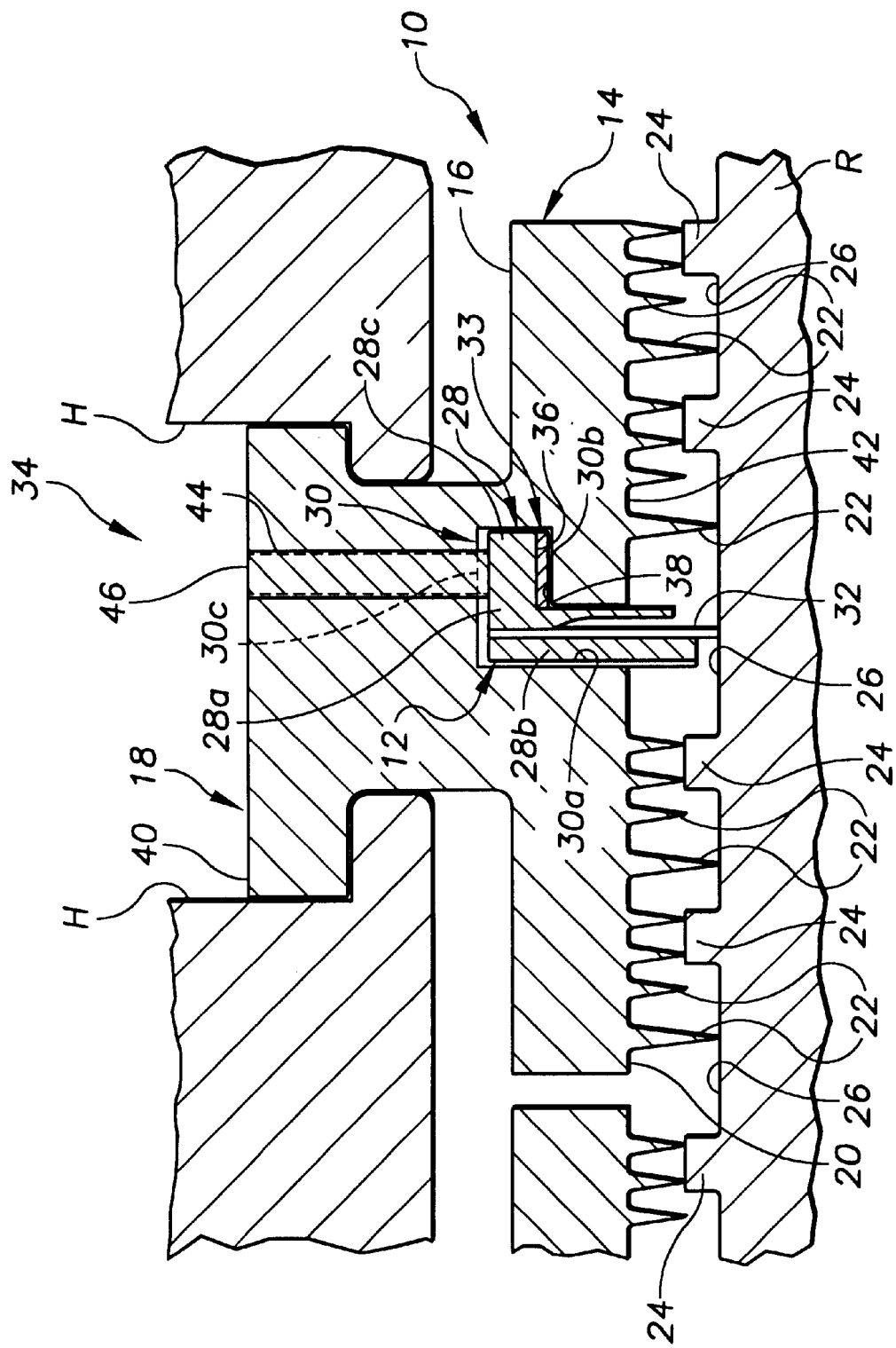
FIG. 3 is an enlarged cross-sectional view of the seal arrangement taken along line 3—3 of FIG. 2.

Referring now to FIGS. 1 to 3 of the drawings, there is illustrated a seal arrangement of the present invention, generally designated 10, for radially positioning an annular brush seal 12 relative to an annular main seal 14, such as a labyrinth seal, and to a turbine shaft or rotor R. The annular labyrinth seal 14 is mounted in a turbine housing H and extends about the rotor R which is supported by conventional means, not shown, within the turbine housing H. The labyrinth seal 14 is disposed between the rotating rotor R and stationary housing H and includes a seal ring 16 disposed about the rotor R separating high and low pressure regions on axially opposite sides of the ring 16. It will be appreciated that while only one seal ring 16 is disclosed, typically multiple-stage labyrinth seals are provided about the rotor R.

Each seal ring 16 is formed of an annular array of a plurality of arcuate-shaped main seal segments 18 having sealing faces 20 and a plurality of radially projecting, axially spaced teeth 22. The teeth 22 are of a hi-lo design for obtaining close clearances with radial projections or ribs 24 and grooves 26 on the rotor R. The labyrinth seal 14 functions by placing a relatively large number of barriers, i.e., the teeth 22, to the flow of fluid from a high pressure region to a low pressure region on opposite sides of the seal ring 16, with each barrier forcing the fluid to follow a tortuous path.

The annular brush seal 12 is formed of an annular array of a plurality of arcuate-shaped brush seal segments 28 incorporated as a retrofit to or as original equipment in the labyrinth seal 14. One or more teeth 22 of the labyrinth seal 14 are removed and replaced with the brush seal 12. As seen in FIG. 3, a centrally-located labyrinth seal tooth 22 is removed and a slot 30 is formed in the seal ring 16 in its place for receiving the brush seal segments 28 therein. Each of the brush seal segments 28 making up the brush seal 12 has a plurality of bristles 32 which engage the rotor R about the circumference thereof.

Referring to FIG. 3, the arrangement 10 of the present invention basically includes the main seal segment 18, the brush seal segment 28, means 33 for establishing a minimum spacing between the main seal segment 18 and the brush seal segment 28, and means 34 for forcing the brush seal segment 28 toward the rotor R against the minimum spacing means 33. The main seal segment 18 has the slot 30 which is open toward the rotor R and defines an interior ledge 36 facing away from the rotor R. The brush seal segment 28 defines an exterior shoulder 38 facing toward the rotor R and has a portion 28a which is smaller in size cross-sectionally than the slot 30 so as to allow insertion of the portion 28a of the brush seal segment 28 into the slot 30 such that the exterior shoulder 38 of the brush seal segment 28 overlies the interior ledge 36 of the main seal segment 18, the brush seal segment 28 can move radially relative to the main seal segment 18 and rotor R, and the exterior shoulder 38 of the brush seal segment 28 can move toward and away from the interior ledge 36 of the main seal segment 18. The minimum spacing established by means 33 is established between the interior ledge 36 of the main seal segment 18 and the exterior shoulder 38 of the brush seal segment 28. The means 34 for forcing the brush seal segment 28 toward the rotor R brings the exterior shoulder 38 of the brush seal segment 28 toward the interior ledge 36 of the main seal segment 18 so as to place and hold the exterior shoulder 38 of the brush seal segment 28 at the minimum spacing from the interior ledge 36 of the main seal segment 18 as established by the means 33 and thereby prevent radial floating of the brush seal segment 28 relative to the main seal segment 18 and the rotor R.

More particularly, the main seal segment 18 is arcuate shaped for placing the main seal segment 18 about the curvature of the rotor R and has an outer periphery 40 facing away from the rotor R, an inner periphery 42 spaced radially inwardly from the outer periphery 40 and facing toward the rotor R, and the slot 30 defined in the main seal segment 18 between the outer and inner peripheries 40, 42 thereof. The slot 30 has a radial portion 30a and an axial portion 30b. The radial portion 30a is open at the inner periphery 42 of the main seal segment 18 and extends away from the rotor R toward the outer periphery 40. The axial portion 30b is spaced from the outer and inner peripheries 40, 42 of the main seal segment 18 and merges in a transverse relationship from a side of the radial portion 30a along the rotor R so as to define the interior ledge 38 in the main seal segment 18 facing away from the rotor R. The brush seal segment 28 is arcuate-shaped for conforming to the arcuate-shaped main seal segment 18 and has a radial section 28b and an axial section 28c. The axial section 28c is connected to and merges in a transverse relationship from a side of the radial section 28b so as to define the exterior shoulder 36 on the brush seal segment 28 facing toward the rotor R such that the radial and axial sections 28b, 28c of the brush seal segment 28 conform in shape to the radial and axial portions 30a, 30b of the slot 30 of the main seal segment 18 as to slidably fit therein and the brush seal segment 28 is movable radially relative to the main seal segment 18 and the rotor R and the exterior shoulder 36 of the brush seal segment 28 overlies and is movable toward and away from the interior ledge 38 of the main seal segment 18.

Figure 4:
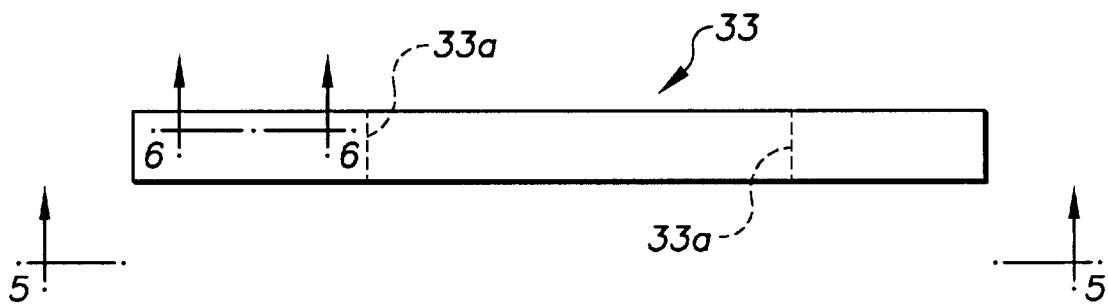
FIG. 4 is a top plan view of a shim of the seal arrangement of FIG. 3.
Figure 5:
FIG. 5 is a side elevational view of the shim as seen along line 5—5 of FIG. 4.
Figure 6:
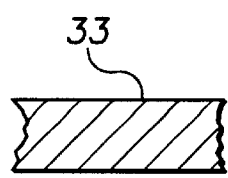
FIG. 6 is an enlarged fragmentary sectional view of the shim taken along line 6—6 of FIG. 4.
Figure 7:
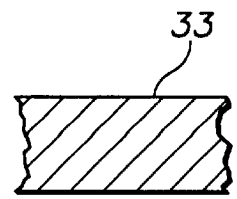
FIG. 7 is another enlarged fragmentary sectional view of the shim showing an alternative embodiment wherein there is a greater thickness at one end than at an opposite end of the shim.

Referring to FIGS. 3 to 6, the means 33 for establishing the minimum spacing is at least one shim 33 disposed between the interior ledge 36 of the main seal segment 18 and the exterior shoulder 38 of the brush seal segment 28. The shim 33 has a predetermined thickness which establishes the desired minimum spacing between the interior ledge 36 of the main seal segment 18 and the exterior shoulder 38 of the brush seal segment 28. The shim 33 has a substantially rectangular configuration when view from the above or below, as shown in FIG. 4. Although the shim 33 is made of a substantially rigid material, such as a spring steel whose thickness is maintained when pressure is applied thereto, because of its substantially greater length than thickness as can be understood from FIG. 5, the shim 33 is sufficiently flexible to conform to the curvature of the main seal segment 18 and brush seal segment 28. The shim 33 may be continuous as shown in solid line form in FIGS. 4 and 5 so as to underlie the entire length of the brush seal segment 28, or may be provided two separate pieces as represented by the dashed lines 33a in FIG. 4 so as to underline only the opposite end portions of the brush seal segment 28. Furthermore, the shim 33 of FIG. 4 can have a uniform thickness throughout its length in instances where a constant minimum spacing is to be established. Alternatively the continuous shim 33 or separate pieces of the shim 33 can have different thicknesses in instances where a different minimum spacing is desired at one end of the brush seal segment 28 than at the opposite end thereof. FIG. 7 depicts a different thickness in one portion or separate piece of the shim 33 than in another portion or piece thereof. Thus, the thickness of the shim 33 may be constant for all segments or may vary from segment to segment or within a given segment as required to achieve an optimal alignment. The use of a shim 33 thus allows for adjustability in the radial alignment of the brush seal 12 in relation to the main seal 14 and to the rotor R. The shim 33 is used in lieu of more expensive and more complicated alignment adjustments, such as reroundable packing rings that employ dowel pins, or additional machining of parts.

Referring to FIGS. 1 to 3, the means 34 for forcing the brush seal segment 28 toward the rotor R includes at least two threaded holes 44 and at least two set screws 46. The two threaded holes 44 extend through the main seal segment 18 to the slot 30 at spaced apart locations 36a, 36b on the main seal segment 18 adjacent to opposite ends 18a thereof. Each of the two set screws 46 is tightened into one of the threaded holes 44 of the main seal segment 18 and into contact with spaced apart locations 38a, 38b on the axial section 28c of the brush seal segment 28 so as to place and hold the exterior shoulder 38 of the brush seal segment 28 at the minimum spacing relative to the interior ledge 38 of the main seal segment 18. Once the proper radial position is reached, the set screws 46 are staked in place to lock the arrangement. By providing a set screw 46 at each end 18a of the main seal segment 18, it is assured that the brush seal segment 28 is not contacting the interior ledge 38 at one of the opposite ends and a top interior surface 30c of the slot 30 opposite from the interior ledge 38 at the other of the opposite ends. If desired, a third set screw (not shown) can be employed at the segment midpoint to further ensure contact with the interior ledge 38 on brush seal segments whose curvature may be mismatched to the labyrinth seal curvature. Alternatively, in some applications springs can be used in place of set screws.

It is thought that the present invention and its advantages will be understood from the foregoing description and it will be apparent that various changes may be made thereto without departing from the spirit and scope of the invention or sacrificing all of its material advantages, the form hereinbefore described being merely an exemplary embodiment thereof.

What is claimed is:

1. An arrangement for radially positioning a turbine brush seal relative to turbine rotor, comprising:

a main seal segment having a slot open toward a turbine rotor and defining an interior ledge facing away from the rotor;

a brush seal segment having an exterior shoulder facing toward the rotor and a portion smaller in size cross-sectionally than said slot of said main seal segment so as to allow insertion of said brush seal segment into said slot such that said exterior shoulder of said brush seal segment overlies said interior ledge of said main seal segment and said brush seal segment can move radially relative to said main seal segment and the rotor and said exterior shoulder of said brush seal segment can move toward and away from said interior ledge of said main seal segment;

means for establishing a minimum spacing between said interior ledge of said main seal segment and said exterior shoulder of said brush seal segment; and means for forcing said brush seal segment toward the rotor such that said exterior shoulder of said brush seal segment is brought toward said interior ledge of said main seal segment so as to place and hold said exterior shoulder of said brush seal segment at said minimum spacing from said interior ledge of said main seal segment and thereby prevent radial floating of said brush seal segment relative to said main seal segment and to the rotor.

2. The arrangement of claim 1 wherein said main seal segment is a labyrinth seal segment.

3. The arrangement of claim 1 wherein said main seal segment is arcuate-shaped for placing said main seal segment about the rotor and has an outer periphery facing away from the rotor, an inner periphery spaced radially inwardly from said outer periphery and facing toward the rotor, and said slot being defined in said main seal segment between said outer and inner peripheries thereof, said slot having a radial portion open at said inner periphery and extending away from the rotor toward said outer periphery and an axial portion spaced from said outer and inner peripheries and merging in a transverse relationship from a side of said radial portion of said slot along the rotor so as to define said interior ledge in said main seal segment facing away from the rotor.

4. The arrangement of claim 3 wherein said brush seal segment is arcuate-shaped for conforming to said arcuate-shaped main seat segment and has a radial section and an axial section connected to and merging in a transverse relationship from a side of said radial section so as to define said exterior shoulder on said brush seal segment facing toward the rotor such that said radial and axial sections of said brush seal segment conform in shape and size relative to said radial and axial portions of said slot of said main seat segment so as to slidably fit therein with said brush seal segment movable radially relative to said main seal segment and the rotor and with said exterior shoulder of said brush seal segment overlying and movable toward and away from said interior ledge of said main seal segment.

5. The arrangement of claim 1 wherein said means for establishing a minimum spacing includes at least one shim disposed between said interior ledge of said main seal segment and said exterior shoulder of said brush seal segment and having a thickness which establishes said minimum spacing between said interior ledge of said main seal segment and said exterior shoulder of said brush seal segment.

6. The arrangement of claim 5 wherein said shim of said minimum spacing establishing means is comprised of a substantially rigid material such that said thickness of said shim is maintained when pressure is applied to said shim.

7. The arrangement of claim 1 wherein said means for forcing said brush seal segment toward the rotor includes at least two threaded holes extending through said main seal segment to said slot at spaced apart locations on said main seal segment.

8. The arrangement of claim 7 wherein said means for forcing said brush seal segment toward the rotor further includes at least two screws each being tightened into one of said threaded holes of said main seal segment and into contact with said brush seal segment at spaced apart locations thereon so as to place and hold said exterior shoulder of said brush seal segment at said minimum spacing relative to said interior ledge of said main seal segment.

9. An arrangement for radially positioning a turbine brush seal location relative to a turbine rotor, comprising:
a labyrinth seal segment being arcuate-shaped for placing about a turbine rotor and having an outer periphery facing away from the rotor, an inner periphery spaced radially inwardly from said outer periphery and facing toward the rotor, and a slot defined in said labyrinth seal segment between said outer and inner peripheries thereof and having a radial portion open at said inner periphery and extending away from the rotor toward said outer periphery and an axial portion spaced from said outer and inner peripheries and merging in a transverse relationship from a side of said radial portion of said slot along the rotor so as to define an arcuate-shaped interior ledge in said labyrinth seal segment facing away from the rotor, said labyrinth seal segment also having at least two threaded holes extending therethrough from said outer periphery thereof to said axial portion of said slot and being spaced apart from one another along an arcuate length of said labyrinth seal segment;
a brush seal segment being arcuate-shaped for conforming to the shape of said labyrinth seal segment, said brush seal segment having a radial section and an axial section connected to and merging in a transverse relationship from a side of said radial section so as to define an arcuate-shaped exterior shoulder on said brush seal segment facing toward the rotor, said brush seal segment having a portion being smaller in size cross-sectionally than said slot in said labyrinth seal segment such that said radial and axial sections of said brush seal segment are slidably fitted into said radial and axial portions of said slot of said labyrinth seal segment with said brush seal segment movable radially relative to said labyrinth seal segment and the rotor and with said exterior shoulder of said brush seal segment overlying and movable toward and away from said interior ledge of said labyrinth seal segment;
at least one shim disposed between and for establishing a minimum spacing between said interior ledge of said labyrinth seal segment and said exterior shoulder of said brush seal segment; and
at least two screws each of which is tightened into one of said threaded holes of said labyrinth seal segment forcing said brush seal segment toward the rotor such that said screws contact spaced apart locations on said brush seal segment so as to place and hold said exterior shoulder of said brush seal segment at said minimum spacing relative to said interior ledge of said labyrinth seal segment and thereby prevent radial floating of said brush seal segment relative to said labyrinth seal segment and the rotor.

10. The arrangement of claim 9 wherein said shim has a thickness which establishes said minimum spacing between said interior ledge of said labyrinth seal segment and said exterior shoulder of said brush seal segment.

11. The arrangement of claim 10 wherein said shim is comprised of a substantially rigid material such that said thickness of said shim is maintained when pressure is applied to said shim.

12. A method for radially positioning a turbine brush seal location relative to a turbine rotor, comprising the steps of:
providing a main seal segment having a slot open toward a turbine rotor and defining an interior ledge facing away from the rotor;
providing a brush seal segment having an exterior shoulder facing toward the rotor and a portion smaller in size cross-sectionally than the slot of the main seal segment such that the brush seal segment can slidably fit into the slot of the main seal segment;
providing at least one shim for establishing a minimum spacing between the interior ledge of the main seal segment and the exterior shoulder of the brush seal segment;
slidably inserting the brush seal segment and the shim into the slot of the main seal segment such that the shim is disposed between the interior ledge of the main seal segment and the exterior shoulder of the brush seal segment, the brush seal segment can move radially relative to the main seal segment and the rotor, and the exterior shoulder of the brush seal segment overlies and can move toward and away from the interior ledge of the main seal segment; and
forcing the brush seal segment toward the rotor such that the exterior shoulder of the brush seal segment is brought toward the interior ledge of the main seal segment so as to place and hold the exterior shoulder of the brush seal segment at the minimum spacing established by the shim from the interior ledge of the main seal segment and thereby prevent radial floating of the brush seal segment relative to the main seal segment and the rotor.

13. The method of claim 12 wherein the main seal segment is a labyrinth seal segment.

14. The method of claim 12 wherein the main seal segment is provided with an arcuate shape for placing the main seal segment about the rotor, an outer periphery facing away from the rotor, an inner periphery spaced radially inwardly from the outer periphery and facing toward the rotor and a slot defined in the main seal segment between the outer and inner peripheries thereof, the slot having a radial portion open at the inner periphery and extending away from the rotor toward the outer periphery and an axial portion spaced from the outer and inner peripheries and merging in a transverse relationship from a side of the radial portion of the slot along the rotor so as to define the interior ledge in the main seal segment facing away from the rotor.

15. The method of claim 14 wherein the brush seal segment is provided with an arcuate shape for conforming to the arcuate shape of the main seal segment, a radial section, and an axial section connected to and merging in a transverse relationship from a side of the radial section so as to define the exterior shoulder on the brush seal segment facing toward the rotor such that the radial and axial sections of the brush seal segment conform in shape and size relative to the radial and axial portions of the slot of the main seal segment as to slidably fit therein and the brush seal segment is movable radially relative to the main seal segment and the rotor and the exterior shoulder of the brush seal segment overlies and is movable toward and away from the interior ledge of the main seal segment.

16. The method of claim 12 wherein the shim has a thickness which establishes the minimum spacing between the interior ledge of the main seal segment and the exterior shoulder of the brush seal segment.

17. The method of claim 16 wherein the shim is comprised of a substantially rigid material such that the thickness of the shim is maintained when pressure is applied to the shim.

18. The method of claim 12 wherein the brush seal segment is forced toward the rotor by providing at least two threaded holes extending through the main seal segment to the slot at spaced apart locations on the main seal segment and by providing at least two screws each being tightened into one of the threaded holes of the main seal segment and into contact with the spaced apart locations on the brush seal segment so as to place and hold the exterior shoulder of the brush seal segment at the minimum spacing relative to the interior ledge of the main seal segment.

19. A method for radially positioning a turbine brush seal location relative to a turbine rotor, comprising the steps of:

providing a labyrinth seal segment with an arcuate shape for placing about a turbine rotor, an outer periphery facing away from the rotor, an inner periphery spaced radially inwardly from the outer periphery and facing toward the rotor, and a slot defined in the labyrinth seal segment between the outer and inner peripheries thereof and having a radial portion opening at the inner periphery extending away from the rotor toward the outer periphery and an axial portion spaced from the outer and inner peripheries and merging in a transverse relationship from a side of the radial portion of the slot along the rotor so as to define an annular-shaped interior ledge in the labyrinth seal segment facing away from the rotor;

providing a brush seal segment with an arcuate shape for conforming to the arcuate shape of the labyrinth seal segment, a radial section, and an axial section connected to and merging in a transverse relationship from a side of the radial section so as to define an arcuate-shaped exterior shoulder on the brush seal segment facing toward the rotor such that radial and axial sections of the brush seal segment conform in shape and size relative to the radial and axial portions of the slot of the labyrinth seal segment as to slidably fit therein, the brush seal segment is movable radially relative to the labyrinth seal segment and the rotor, and the exterior shoulder of the brush seal segment overlies and is movable toward and away from the interior ledge of the labyrinth seal segment;

providing at least one shim for establishing a minimum spacing between the interior ledge of the labyrinth seal segment and the exterior shoulder of the brush seal segment;

slidably inserting the brush seal segment and the shim into the slot of the labyrinth seal segment such that the shim is disposed between the interior ledge of the labyrinth seal segment and the exterior shoulder of the brush seal segment, the radial section of the brush seal segment fits in the radial portion of the slot of the labyrinth seal segment, and the axial section of the brush seal segment fits in the axial portion of the slot of the labyrinth seal segment;

providing at least two threaded holes extending through the labyrinth seal segment from the outer periphery thereof to the axial portion of the slot and being spaced from one another along an arcuate length of the labyrinth seal segment; and screwing a screw into each of the two threaded holes of the labyrinth seal segment and into contact with spaced apart locations on the brush seal segment so as to place and hold the exterior shoulder of the brush seal segment at the minimum spacing from the interior ledge of the labyrinth seal segment as established by the shim so as to prevent radial floating of the brush seal segment relative to the labyrinth seal segment and the rotor.

20. The method of claim 19 wherein the shim has a thickness which establishes the minimum spacing between the interior ledge of the labyrinth seal segment and the exterior shoulder of the brush seal segment.

21. The method of claim 19 wherein the shim is comprised of a substantially rigid material such that the thickness of the shim is maintained when pressure is applied to the shim.

\* \* \* \* \*